United States Patent
Park et al.

(10) Patent No.: US 8,974,937 B2
(45) Date of Patent: *Mar. 10, 2015

(54) CENTER PIN FOR ELECTROCHEMICAL DEVICE

(75) Inventors: Young-Sun Park, Daejeon (KR); Byung-Hun Oh, Daejeon (KR); Pil-Kyu Park, Daejeon (KR); Yong-Tae Lee, Jeonju-si (KR); Jae-Won Lee, Daejeon (KR); Myoung-Hun Lee, Seoul (KR)

(73) Assignee: LG Chem, Ltd. (KR)

( * ) Notice: Subject to any disclaimer, the term of this patent is extended or adjusted under 35 U.S.C. 154(b) by 825 days.

This patent is subject to a terminal disclaimer.

(21) Appl. No.: 12/446,632

(22) PCT Filed: Oct. 22, 2007

(86) PCT No.: PCT/KR2007/005183
§ 371 (c)(1),
(2), (4) Date: Oct. 13, 2009

(87) PCT Pub. No.: WO2008/050980
PCT Pub. Date: May 2, 2008

(65) Prior Publication Data
US 2010/0035131 A1    Feb. 11, 2010

(30) Foreign Application Priority Data
Oct. 23, 2006    (KR) .................. 10-2006-0103041

(51) Int. Cl.
*H01M 6/10*    (2006.01)
*H01M 2/02*    (2006.01)
(Continued)

(52) U.S. Cl.
CPC ...... *H01M 10/0431* (2013.01); *H01M 2200/20* (2013.01); *H01M 2/027* (2013.01); *H01M 2/0275* (2013.01); *H01M 2/0413* (2013.01)
USPC .............................. 429/94; 429/164; 429/133

(58) Field of Classification Search
CPC .......... H01M 10/0431; H01M 10/052; H01M 10/0587; H01M 2200/20; H01M 2/02; H01M 2/04
USPC ..................................... 429/94, 133, 164, 176
See application file for complete search history.

(56) References Cited

U.S. PATENT DOCUMENTS 2,282,760 A    5/1942   Hauel
5,989,743 A *  11/1999  Yamashita .................... 429/129
(Continued)

FOREIGN PATENT DOCUMENTS

JP    07254402 A   10/1995
JP    08-250155 A   9/1996
(Continued)

OTHER PUBLICATIONS

Derwent Abstract for Nakanishi et al., JP 2005-135731 A.*
(Continued)

*Primary Examiner* — Edu E Enin-Okut
(74) *Attorney, Agent, or Firm* — Lerner, David, Littenberg, Krumholz & Mentlik, LLP

(57) ABSTRACT

Disclosed is the structure of a center pin inserted into the winding center of a winding-type electrode assembly of an electrochemical device, which has a case containing the winding-type electrode assembly. The center pin can be manufactured through a simple process and can secure the safety of an electrochemical device when physical impact (e.g. squeezing, shock) is applied from the outside or when the internal temperature rises. The center pin is manufactured by winding a planar substrate, which has at least two protrusions formed in an embossing type or which has at least two scores formed in a predetermined shape, into a tubular shape.

13 Claims, 5 Drawing Sheets

(51) Int. Cl.
   *H01M 2/14* (2006.01)
   *H01M 10/04* (2006.01)
   *H01M 2/04* (2006.01)

(56) References Cited

U.S. PATENT DOCUMENTS

| | | | |
|---|---|---|---|
| 6,063,518 | A | 5/2000 | Dewulf et al. |
| 6,207,321 | B1 | 3/2001 | Fukagawa et al. |
| 2004/0258987 | A1 | 12/2004 | Shin |
| 2005/0008930 | A1* | 1/2005 | Johnson et al. ............ 429/94 |
| 2006/0263676 | A1 | 11/2006 | Chang et al. |
| 2007/0269711 | A1 | 11/2007 | Meguro et al. |

FOREIGN PATENT DOCUMENTS

| | | | | |
|---|---|---|---|---|
| JP | 08-255631 | A | | 10/1996 |
| JP | 08-264206 | A | | 10/1996 |
| JP | 11-067263 | A | | 3/1999 |
| JP | 11067263 | | | 3/1999 |
| JP | 11067263 | A | * 3/1999 | ............ H01M 10/04 |
| JP | 11-204140 | A | | 7/1999 |
| JP | 11204130 | | | 7/1999 |
| JP | 2004-106225A | A | | 4/2004 |
| JP | 2005135731 | A | * 5/2005 | ............ H01M 2/20 |
| JP | 17317441 | | | 10/2005 |
| JP | 2005-317441 | A | | 11/2005 |
| JP | 2006-134760 | A | | 5/2006 |
| KR | 20040110600 | A | | 12/2004 |
| KR | 2006104333 | A | | 4/2008 |
| TW | 1288981 | B | | 10/2007 |
| WO | 2006049167 | A1 | | 5/2006 |

OTHER PUBLICATIONS

International Search Report, PCT/KR2007/005183.
International Search Report, PCT/KR2007/005184.
Abstract of JP 07254402 A, Hanabusa et al., Oct. 1995.

* cited by examiner

CENTER PIN FOR ELECTROCHEMICAL DEVICE

CROSS REFERENCE TO RELATED APPLICATIONS

The present application is a national phase entry under 35 U.S.C. §371 of International Application No. PCT/KR2007/005183, filed Oct. 22, 2007, published in English, which claims the benefit of Korean Patent Application No. 10-2006-0103041, filed Oct. 23, 2006. The disclosures of said applications are incorporated by reference herein.

BACKGROUND OF THE INVENTION

1. Field of the Invention

The present invention relates to the structure of a center pin inserted into the winding center of a winding-type electrode assembly of an electrochemical device, which has a case containing the winding-type electrode assembly, and more particularly to a center pin which can be manufactured through a simple process and which can secure the safety of an electrochemical device when physical impact (e.g. squeezing, shock) is applied from the outside or when the internal temperature rises.

2. Description of the Prior Art

As generally known in the art, lithium secondary batteries with high energy density have been extensively developed in line with the recent trend towards compact and light electronic equipment, as well as the widespread use of portable electronic devices.

Lithium secondary batteries use substances that are adapted to intercalate and deintercalate lithium ions in their cathode and anode, respectively, and an organic electrolyte or a polymer electrolyte fills the space between the cathode and anode. The Lithium secondary batteries create electric energy based on the oxidation and reduction reactions occurring when lithium ions are intercalated to and deintercalted from the cathode and anode, respectively.

However, lithium secondary batteries have a safety problem, and various efforts have been made to solve it.

In general, lithium secondary batteries using a flammable non-aqueous electrolyte explode or catch fire due to a flammable gas resulting from the decomposition reaction of the electrolyte when the internal temperature of the batteries rises, due to a flammable gas resulting from the reaction between the electrolyte and the electrodes, or due to oxygen created as a result of decomposition of the cathode.

Furthermore, if a battery is crushed by a heavy object, if strong impact acts on the battery, or if the battery is exposed to a high temperature, the safety problem occurs. Particularly, the cathode and anode inside the battery are locally short-circuited if a nail penetrates the battery, if the battery is squeezed, if impact is applied to the battery, or if the battery is exposed to a high temperature. As a result, an excessive amount of current locally flows and generates heat. The amount of short-circuit current resulting from the local short circuit is inversely proportional to the resistance, and a larger amount of short-circuit current flows toward portions with low resistance. In this case, a very large amount of heat is locally generated around the short-circuited portion.

If heat is generated inside a battery, the cathode, anode, and electrolyte, which constitute the interior of the battery, react with one another or burn. This reaction is highly exothermic, and the battery finally catches fire or explodes. Therefore, such abrupt heat generation inside the battery must be avoided.

SUMMARY OF THE INVENTION

The object of the present invention to provide a center pin which can be manufactured through a simple process and which can secure the safety of an electrochemical device when physical impact (e.g. squeezing, shock) is applied from the outside or when the internal temperature rises.

In order to achieve the above-mentioned object, the present invention provides a center pin to be inserted into a winding center of an electrochemical device having a case containing a winding-type electrode assembly, wherein the center pin is manufactured by winding a planar substrate into a tubular shape, the planar substrate having at least two protrusions formed in an embossing type or at least two discontinuous scores formed in a predetermined shape; and a portion of the planar substrate forms protrusions, the portion lying on a score boundary portion, when or before the planar substrate having the scores is wound into a tubular shape.

Also, the present invention provides an electrochemical device comprising: a winding-type electrode assembly obtained by stacking and winding a first separation film, a first electrode plate having a first electrode tab, a second separation film and a second electrode plate having a second electrode tab; a case containing the winding-type electrode; and the above-mentioned center pin inserted into a winding center of the winding-type electrode assembly.

DETAILED DESCRIPTION OF THE EXEMPLARY EMBODIMENTS

Hereinafter, the present invention will be explained in more detail.

A center pin according to the present invention is inserted into the winding center of an electrochemical device, which has a case containing a winding-type electrode assembly.

A winding-type electrode assembly using a center pin according to the present invention includes a first separation film, a first electrode plate having a first electrode tab, a second separation film, and a second electrode plate having a second electrode tab. The center pin is adjacent to the first separation film, which has been wound, and is electrically insulated from the first electrode plate by the first separation film.

Figure 1:
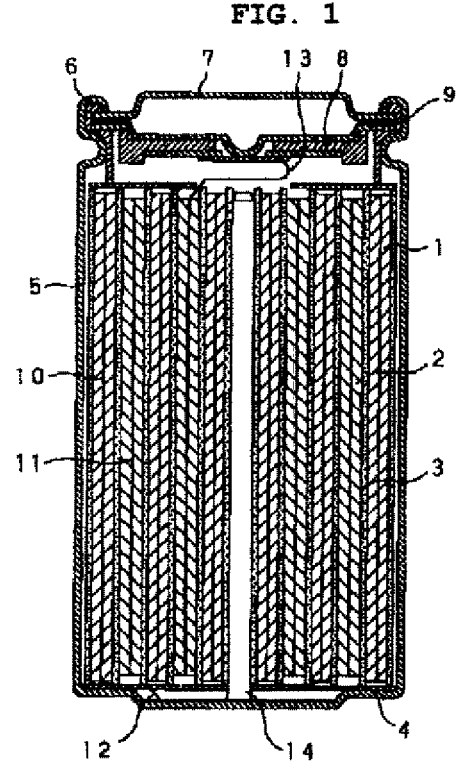
FIG. 1 shows an electrochemical device having an electrode assembly wound by a center pin according to the prior art.

The winding-type electrode assembly is contained in a case, the example of which is an assembly including a can and a cap for sealing the cap. The can is made of an electrically conductive material, and may act as a second electrode terminal electrically connected to the second electrode tab (refer to FIG. 1).

The center pin according to the present invention characteristically includes: a center pin manufactured by winding a planar substrate, which has at least two protrusions formed in an embossing type or which has at least two discontinuous scores formed in a predetermined shape, into a tubular shape. Accordingly, the manufacturing process of the center pin according to the present invention is simple.

Figure 2:
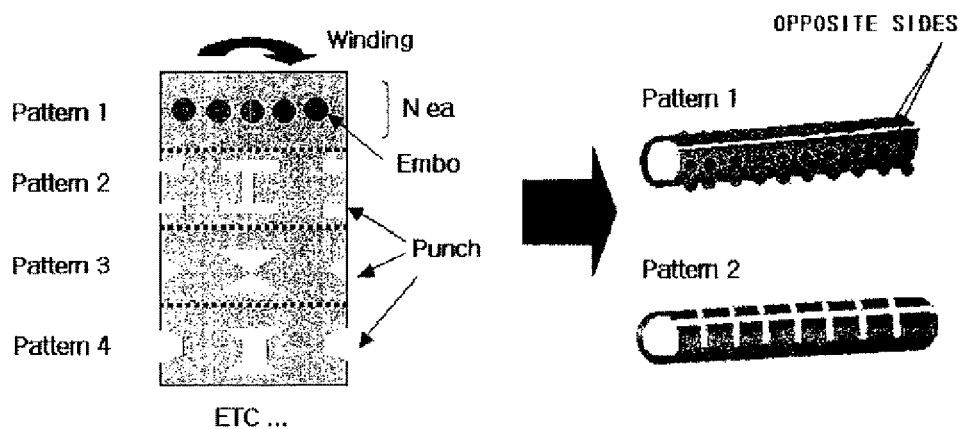
FIG. 2 briefly shows a process for manufacturing a center pin according to the present invention.

In this case, by winding the planar substrate, a hollow tube is formed (refer to FIG. 2).

The axial space inside the center pin can be used as a gas passage when pressure is applied, and advantageously decreases the internal pressure.

The planar substrate having at least two protrusions formed in an embossing type can be manufactured by processing a planar substrate with various embossing machines (e.g. embossing stampers).

Figure 3:
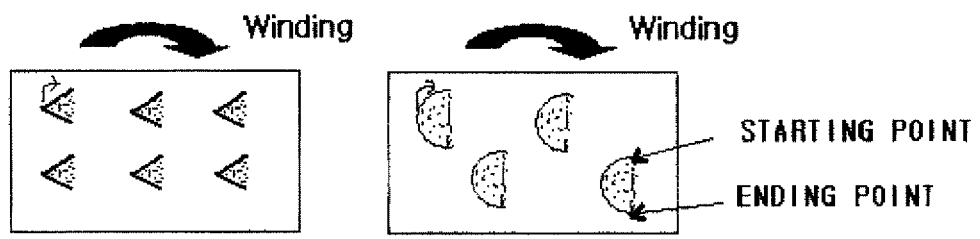
FIG. 3 shows exemplary planar substrates having at least two discontinuous scores formed in a predetermined shape.

By winding a planar substrate into a tubular shape (i.e. cylindrical shape), protrusions can be formed on a portion of the planar substrate, which lies on the score boundary portion (refer to FIGS. 2 and 3).

Before winding the planar substrate, protrusions resulting from scores may be obtained by forming scores on the planar substrate and stamping it so that protrusions are formed on a portion of the substrate, which lies on the score boundary portion. For example, a planar substrate having scores formed thereon is placed into a stamper, extruded, and heat-treated so that protrusions are formed.

The scores may be formed by a punch. FIGS. 2 and 3 show exemplary planar substrates having at least two discontinuous scores formed in a predetermined shape.

The starting and ending points of a score may coincide with each other so that a closed loop is established. Alternatively, the starting and ending points may not coincide with each other so that an open loop is established. Each score may be a combination of at least two straight lines, a single curved line, a combination of at least two curved lines, or a combination of straight and curved lines. As such, the scores and the protrusions can come in various shapes.

The planar substrate or the center pin may be made of stainless steel, titanium, nickel, or aluminum, but the material is not limited to that. The planar substrate or the center pin is preferably made of an electrically conductive material.

In the case of embossing-type protrusions, they may be made of a material different from that of the planar substrate.

The planar substrate may have a thickness of 0.1-1 mm depending on the size of the electrochemical device. The thickness is preferably 0.1-0.4 mm.

The diameter of the center pin is determined in conformity with the size of the mandrel of the electrochemical device, but should not be too large. For example, the center pin may have an inner diameter of 1.5-6 mm, preferably 3-4 mm. The protrusions on the center pin may have a height of 0.1-2 mm, preferably 0.2-0.6 mm.

The degree of sharpness and/or the strength of the protrusions may be adjusted so that the limit of internal or external pressure, which can fracture the separation films, the electrodes, etc., can be adjusted.

Preferably, the protrusions are evenly distributed on the entire surface of the center pin in consideration of safety.

The embossing-type protrusions or protrusions formed by scores may be formed on the inner peripheral surface of the hollow tube-type center pin, on its outer peripheral surface, or on both inner and outer peripheral surfaces thereof.

If the embossing-type protrusions or protrusions formed by scores are formed on the outer peripheral surface of the center pin, the following advantages can be expected:

If physical impact is applied to the battery from the outside, the separation film inside the battery, which prevent the cathode and anode from contacting each other, is torn off, and a short circuit occurs. If a minute short circuit occurs, the high energy of the battery is concentrated in the minute region that has been short-circuited. The excessive current generates heat, which is concentrated in the minute region, and the resulting instantaneous thermal runaway may cause the battery to catch fire or explode.

Therefore, the center pin having embossing-type protrusions or protrusions formed by scores according to the present invention intentionally create a number of short circuits when impact is applied from the outside, so that the short-circuit current: is distributed over a number of short-circuited regions. This preferably distributes the created current and/or heat to the center pin so that the battery is not endangered by thermal runaway.

It is to be noted that the center pin according to the present invention retains the embossing-type protrusions or the protrusions formed by scores even in a normal condition so that a number of short circuits can be intentionally induced by the protrusions, even if the center pin has not been deformed or before the center pin is deformed. This reliably prevents an emergent situation of the battery (e.g. thermal runaway) resulting from concentration and accumulation of energy.

In order to intentionally create a number of short circuits by the embossing-type protrusions or the protrusions crated by scores, the protrusions must be adapted to fracture the separation film adjacent to the center pin, or to fracture the first separation film, the second electrode plate, and the second separation film.

In order to ensure that short circuits are created simply by fracturing the separation film, the center pin must be made of an electrically conductive material and electrically connected to the second electrode tab of the second electrode plate. In a normal condition, the center pin must be insulated form the first electrode plate by the first separation film (refer to FIGS. 5 to 8).

It is to be noted that, when the first separation film, the second electrode plate, and the second separation film must be fractured to intentionally create short circuits, the center pin is electrically insulated from the electrode terminals.

When a planar substrate is wound into a tubular shape to form a hollow tube, the two opposite sides of the wound planar substrate, which are adjacent to each other in the axial direction, preferably contact each other without overlapping each other, or they are preferably spaced from each other. The edges of the opposite sides are positioned so that they are exposed neither to the outside nor to the inside in a normal condition.

When pressure of a predetermined level or higher is applied from the outside, the opposite sides crisscross each other, or their edges protrude toward the inside or outside so that the adjacent member(s), e.g. the separation films, the electrode plates, the container inside the center pin, etc., can be axially fractured along a straight line so as to correspond to respective sides.

Besides the fact that, when external impact is applied, the protrusions near the impacted local region can additionally create intentional local short circuits, the edges of the opposite sides can also create intentional short circuits over the entire axial surface, even if the external impact is local, because the entire axial region is fractured by the edges of the opposite sides. In addition, even if no protrusions can be formed on both ends of the electrochemical device in the axial direction of the center pin due to processing-related limitations, the edges of the opposite sides of the planar substrate can create intentional short circuits when external impact is applied to both ends of the electrochemical device.

Figure 5:
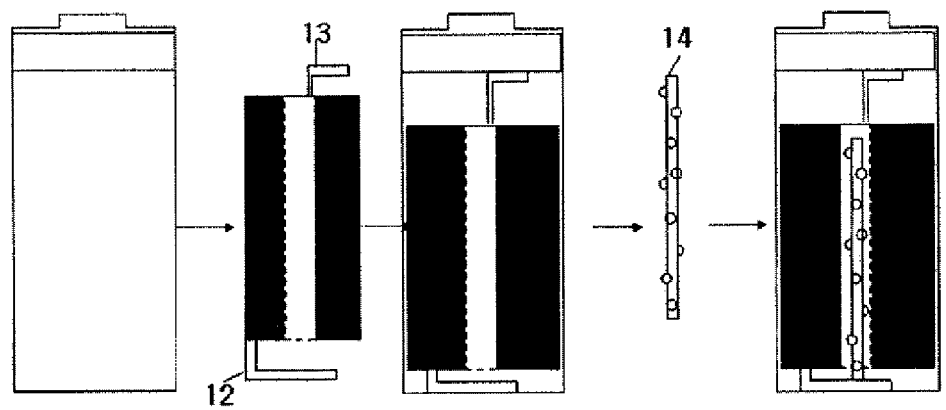
FIG. 5 shows how to assemble a battery by using a center pin according to an embodiment of the present invention.
Figure 6:
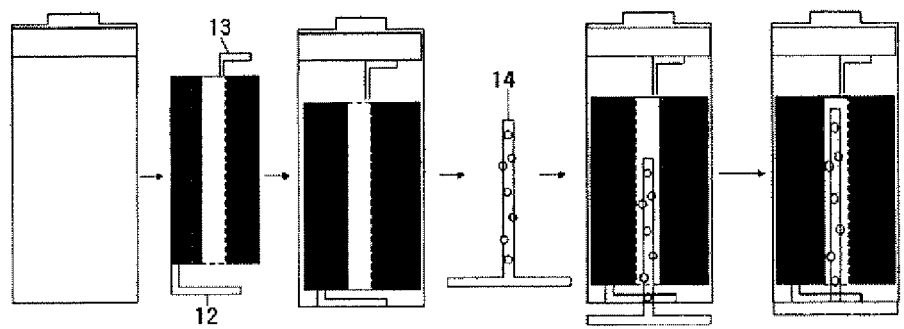
FIG. 6 shows how to assemble a battery by using a center pin according to another embodiment of the present invention.

FIGS. 5 and 6 show how to assemble an electrochemical device by using a center pin having protrusions formed on its surface according to embodiments of the present invention. As shown in FIGS. 5 and 6, an electrode assembly is inserted into a container, and then the center pin is inserted.

Figure 7:
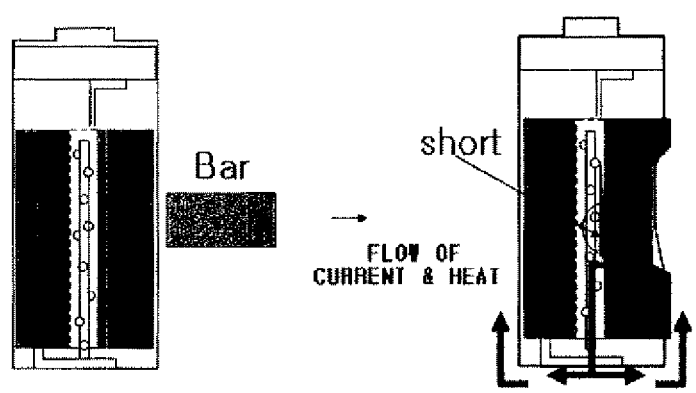
FIG. 7 briefly shows how safety is ensured by a center pin according to an embodiment of the present invention.
Figure 8:
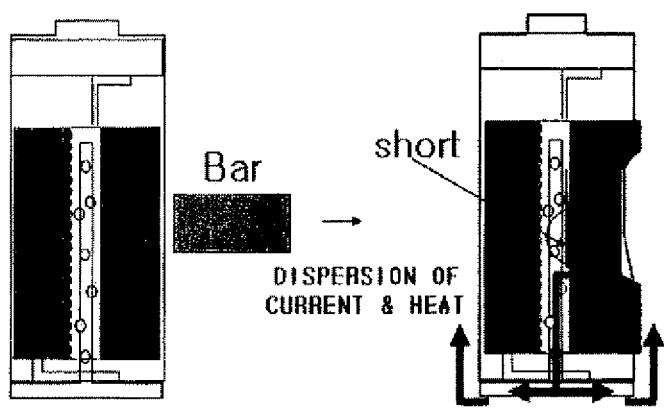
FIG. 8 briefly shows how safety is ensured by a center pin according to another embodiment of the present invention.

Referring to FIGS. 7 and 8, a center pin 14 having at least one protrusion formed on its surface so that the separation film can be fractured when pressure of a predetermined level or higher is applied from the outside, according to an embodiment of the present invention, is electrically connected to a second electrode tab 12 made of an electrically conductive material and provided on the second electrode plate, or to a second electrode terminal 5 electrically connected to the second electrode tab. In a normal condition, the center pin is electrically connected to the second electrode plate and is electrically insulated from the first electrode plate by the first separation film. If pressure of a predetermined level or higher is applied from the outside, the first separation film is fractured by the protrusions so that the center pin and the first electrode plate are intentionally short-circuited. As a result, the short-circuit current is distributed over a number of short-circuited regions and is also distributed to the battery can 5 via the center pin. This prevents the battery from being endangered by thermal runaway (refer to FIGS. 7 and 8).

The center pin and/or the can are preferably made of a thermally conductive material so that heat resulting from short circuits can be distributed to the center pin and/or the can (refer to FIGS. 7 and 8).

Figure 4:
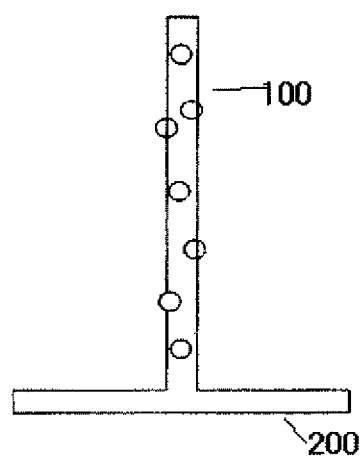
FIG. 4 shows the brief structure of a center pin according to an embodiment of the present invention.

In addition, the center pin according to the present invention may be physically connected to a structure made of an electrically and thermally conductive material and exposed to the outside of the case. In this case, currents and/or heat resulting from a short circuit can be dispersed to the outside via the center pin and the structure. As shown in FIG. 4, an exemplary center pin includes a tubular first member 100 to be inserted into the winding center of a winding-type battery assembly, and a second member 200 physically connected to a lateral surface of the first member and exposed to the outside of the case. The first and second members are made of electrically and thermally conductive materials, respectively. The first member has at least one protrusion on its surface. The central axis of the first member is preferably perpendicular to a surface of the second member.

The present invention can employ the above-mentioned center pin to improve the safety of every type of electrochemical devices adapted to undergo electrochemical reactions, including every type of primary batteries, secondary batteries, fuel cells, solar cells, capacitors. The secondary batteries preferably include lithium secondary batteries, such as lithium metal secondary batteries, lithium ion secondary batteries, lithium polymer secondary batteries, and lithium ion polymer secondary batteries. However, the present invention is applicable to every type of electrochemical devices including not only lithium ion batteries, but also nickel hydrogen batteries and nickel cadmium batteries. The present invention is also applicable to future batteries expected to replace lithium ion batteries.

There is no specific limitation on the shape of the electrochemical device used by the present invention, and the device can have various sizes and/or shapes including a cylinder type, a flat type, a bulk type, etc. The present invention is equally applicable to a pack case, a hard pack, and a soft pack.

The present invention provides an electrochemical device pack including a single electrochemical device, which is constructed as mentioned above, or a plurality of electrochemical devices combined based on parallel or serial connection.

Hereinafter, the present invention will be exemplified by a lithium secondary battery.

The lithium secondary battery includes a cathode comprising a lithium composite oxide as cathode active material, an anode capable of lithium intercalation/deintercalation, a non-aqueous electrolyte and a separation film.

As a cathode active material, the general cathode active material used in the conventional electrochemical devices may be used. Non-limiting example of the cathode active materials include: lithium transition metal composite oxides, such as $LiM_xO_y$ (M=Co, Ni, Mn, $Co_aNi_bMn_c$) (e.g. lithium manganese composite oxides such as $LiMn_2O_4$, lithium nickel oxides such as $LiNiO_2$, lithium cobalt oxides such as $LiCoO_2$, other oxides obtained by substituting manganese, nickel and cobalt in the above oxides partially with other transition metals, or lithium-containing vanadium oxide, etc.); or calcogenides, such as manganese dioxide, titanium disulfide, molybdenum disulfide, etc. Preferably, the cathode active material can be $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, $a+b+c=1$), $LiNi_{1-Y}Co_YO_2$, $LiCo_{1-Y}Mn_YO_2$, $LiNi_{1-Y}Mn_YO_2$ (wherein, $0 \leq Y<1$), $Li(Ni_aCo_bMn_c)O_4$ (wherein $0<a<2$, $0<b<2$, $0<c<2$, and $a+b+c=2$), $LiMn_{2-z}Ni_zO_4$, $LiMn_{2-z}Co_zO_4$ (wherein $0<Z<2$), $LiCoPO_4$, $LiFePO_4$ or the mixture thereof. More preferably, the cathode active material can be $Li_xMO_2$ (wherein, M is Ni, Co, or Mn, and $0.05 \leq x \leq 1.10$).

The cathode active material is bonded to a cathode current collector such as foil formed of aluminum, nickel or combinations thereof to provide the cathode.

As an anode active material, the general anode active material used in the conventional electrochemical devices may be used. Non-limiting example of the anode active materials include lithium metal, lithium alloys, carbon, petroleum coke, activated carbon, graphite or other carbonaceous materials capable of lithium ion intercalation/deintercalation. The anode active material is bonded to an anode current collector such as foil formed of copper, gold, nickel, copper alloys or combinations thereof to provide the anode.

The separation film that may be used has a micro-porous structure and includes multilayer films formed of polyethylene, polypropylene or combinations thereof, or polymer films for solid polymer electrolytes or gel polymer electrolytes such as polyvinylidene fluoride, polyethylene oxide, polyacrylonitrile or polyvinylidene fluoride-hexafluoropropylene copolymer.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $ASF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone and mixtures thereof.

Hereinafter, the present invention will be described in detail by the following examples and comparative examples. It is to be understood, however, that these examples are given for illustrative purpose only and are not construed to limit the scope of the present invention.

Comparative Embodiment 1

A lithium ion cylindrical secondary battery from LG Corporation (product name: ICP18650, 2400 mAh) was used. The cathode active material of the battery was $LiCoO_2$, the anode active material was graphite, and the separation film was made of polypropylene. A stainless steel center pin having a diameter of 3 mm and a length of 5.75 cm was used.

Exemplary Embodiment 1

A battery was assembled from the same components as in the case of the comparative embodiment 1, except for a center pin 14 manufactured by winding a planar substrate which was made of stainless steel and which had embossing-type protrusions evenly distributed thereon, as in the case of pattern 1 shown in FIG. 2. The planar substrate had a thickness of 0.3 mm, and the embossing-type protrusions had a height of 0.3 mm.

Experiment

The lithium ion cylindrical batteries manufactured according to the comparative embodiment 1 and exemplary embodiment 1 were fully charged up to 4.2V and were subjected to a crushing test.

During the crushing test, a cell-type structure was installed beneath a disk having a diameter of 30 cm, and was hydraulically pressurized at a speed of 3-4 mm/sec until the pressure reaches 3000 lbs while watching the recorded temperature and voltage. The result concerning the comparative embodiment 1 and exemplary embodiment 1 are shown in FIGS. 9 and 10, respectively.

Figure 9:
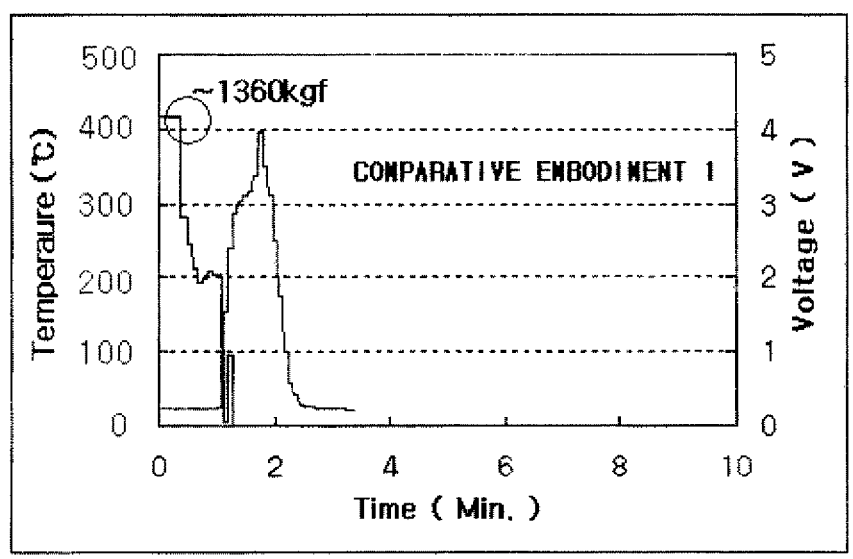
FIG. 9 shows the result of a crushing experiment on a battery manufactured according to comparative embodiment 1.
Figure 10:
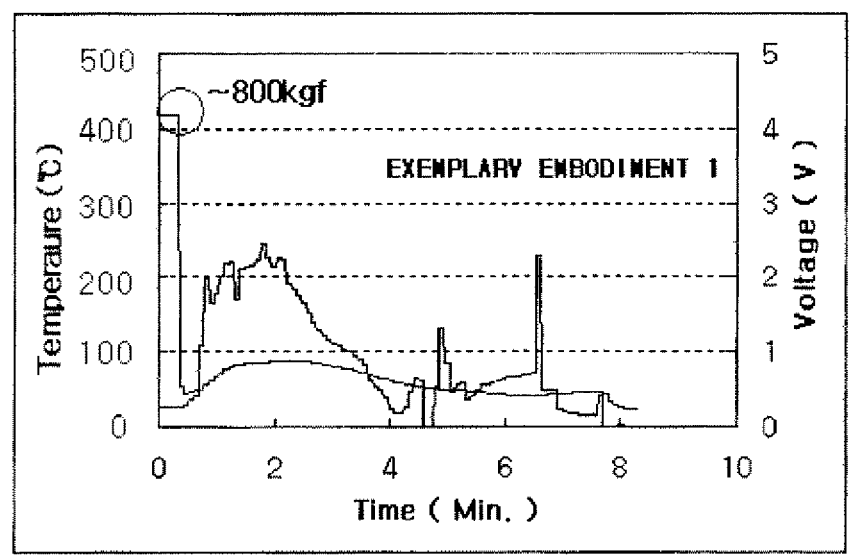
FIG. 10 shows the result of a crushing experiment on a battery manufactured according to exemplary embodiment 1.

It is clear from FIG. 9 that, as the pressure on the battery according to the comparative embodiment 1 increases, the degree of short circuit gradually increased, and the voltage slowly dropped. Heat was locally generated inside the battery, and the temperature abruptly rose in a short period of time. The battery then caught fire.

However, in the case of the battery according to the exemplary embodiment 1 shown in FIG. 10, the voltage of the battery instantaneously dropped due to the large-area short circuit, and the highest temperature inside the battery was below 100° C. This is because the center pin according to the present invention, which had been manufactured by winding a planar substrate having at least one protrusion formed on its surface, caused a large-area short circuit in the jelly roll of the mandrel, distributed the short-circuit current, and suppressed the heat generation of the battery.

As mentioned above, the center pin according to the present invention has the following advantage: when pressure of a predetermined level or higher is applied from the outside, the protrusions formed on the surface of the center pin and/or the edges of the two opposite sides arranged along a straight line can create intentional short circuits. This prevents the electrochemical device from being endangered by thermal runaway and secures the safety of the device.

What is claimed is:

1. A center pin to be inserted into a winding center of an electrochemical device having a case containing a winding-type electrode assembly including a first separation film, a first electrode plate, and a second separation film, the center pin comprising:
    a tubular shape obtained by winding a planar substrate; and
    at least two embossed protrusions formed on an outer peripheral surface of the tubular shape,
        wherein the center pin is adapted to insert into the winding center of the winding-type electrode assembly adjacent to the first separation film, and
        wherein the embossed protrusions are adapted to fracture only the first separation film when pressure of a predetermined level or higher is applied from an outside.

2. The center pin as claimed in claim 1, wherein two opposite sides of the planar substrate wound into a tubular shape, the opposite sides facing each other in an axial direction, are adapted to contact each other without overlapping each other or to face each other while being spaced from each other.

3. The center pin as claimed in claim 1, wherein edges of two opposite sides of the planar substrate wound into a tubular shape, the opposite sides facing each other in an axial direction, protrude when pressure of a predetermined level or higher is applied from an outside so that adjacent member(s) is fractured along a straight line so as to correspond to respective opposite sides.

4. The center pin as claimed in claim 1, wherein the center pin has a first member formed by using the planar substrate wound into a tubular shape and a second member physically connected to a lateral surface of the first member and exposed to an outside of the case, and the first and second members are made of electrically and thermally conductive materials, respectively.

5. The center pin as claimed in claim 4, wherein the tubular first member has a central axis perpendicular to a surface of the second member.

6. The center pin as claimed in claim 1, wherein the embossed protrusions are evenly distributed on an entire surface of the planar substrate.

7. An electrochemical device comprising:
    the winding-type electrode assembly obtained by stacking and winding the first separation film, the first electrode plate having a first electrode tab, the second separation film and a second electrode plate having a second electrode tab;
    a case containing the winding-type electrode assembly; and
    the center pin according to claim 1 inserted into the winding center of the winding-type electrode assembly.

8. The electrochemical device as claimed in claim 7, wherein the embossed protrusions are formed by embossing stamping or by forming scores on the planar substrate and stamping to form the embossed protrusions on a boundary of the scores, and
    wherein the center pin is made of an electrically conductive material and is electrically connected to the second electrode tab of the second electrode plate, the center pin is insulated from the first electrode plate by the first separation film in a normal condition, and, when pressure of a predetermined level or high is applied from an outside, the protrusions fracture the first separation film so that at least one short circuit is created intentionally.

9. The electrochemical device as claimed in claim 8, wherein the case is an assembly of a can for containing the winding-type electrode assembly and a cap for sealing the can, the can is made of an electrically conductive material, and the can act as a second electrode terminal electrically connected to the second electrode tab or the center pin.

10. The electrochemical device as claimed in claim 9, wherein the center pin and the can are made of a thermally conductive material.

11. The electrochemical device as claimed in claim 10, wherein the center pin is physically connected to a structure made of an electrically and thermally conductive material and exposed to an outside of the case.

12. The electrochemical device as claimed in claim 7,
wherein the embossed protrusions are formed by embossing stamping or by forming discontinuous scores in a predetermined shape on the planar substrate and stamping to form the embossed protrusions on a score boundary portion, when or before the planar substrate is wound into the tubular shape, and
wherein when two opposite sides of the planar substrate are wound into the tubular shape, the opposite sides facing each other in an axial direction, are adapted to contact each other without overlapping each other or to face each other while being spaced from each other.

13. The electrochemical device as claimed in claim 7,
wherein the embossed protrusions are formed by embossing stamping or by forming discontinuous scores in a predetermined shape on the planar substrate and stamping to form the embossed protrusions on a score boundary portion, when or before the planar substrate is wound into the tubular shape, and
wherein when edges of two opposite sides of the planar substrate are wound into the tubular shape, the opposite sides facing each other in an axial direction, protrude when pressure of a predetermined level or higher is applied from an outside so that adjacent member(s) is fractured along a straight line so as to correspond to respective opposite sides.

* * * * *

UNITED STATES PATENT AND TRADEMARK OFFICE
CERTIFICATE OF CORRECTION

PATENT NO. : 8,974,937 B2  Page 1 of 1
APPLICATION NO. : 12/446632
DATED : March 10, 2015
INVENTOR(S) : Young-Sun Park et al.

It is certified that error appears in the above-identified patent and that said Letters Patent is hereby corrected as shown below:

In the specification
Column 8, line 18, after "when" insert -- a --.
Column 8, line 25, after "wherein" insert -- when --.
Column 8, line 26, after "substrate" insert -- are --.
Column 8, line 28, delete ",".
Column 8, line 28, after "when" insert -- the --.
Column 8, line 28, "a" should read -- the --.
Column 8, line 29, "an" should read -- the --.
Column 8, line 64, after "when" insert -- the --.
Column 8, line 65, "a" should read -- the --.
Column 8, line 65, "high" should read -- higher --.
Column 8, line 65, "an" should read -- the --.
Column 9, line 5, "act" should read -- acts --.
Column 10, line 3, delete ",".
Column 10, line 15, delete ",".
Column 10, line 16, after "when" insert -- the --.
Column 10, line 16, "a" should read -- the --.
Column 10, line 17, "an" should read -- the --.

Signed and Sealed this
Fifth Day of July, 2016

Michelle K. Lee
*Director of the United States Patent and Trademark Office*